United States Patent [19]

Yamada et al.

[11] Patent Number: 4,893,204
[45] Date of Patent: Jan. 9, 1990

[54] AIR BEARING HEAD SLIDER HAVING FIRST AND SECOND LEADING EDGE TAPERED PORTIONS

[75] Inventors: Tadaharu Yamada; Makoto Watanabe; Yoshihiro Terada, all of Tokyo, Japan

[73] Assignee: NEC Corporation, Tokyo, Japan

[21] Appl. No.: 165,061

[22] Filed: Mar. 7, 1988

[30] Foreign Application Priority Data

Mar. 6, 1987 [JP] Japan .................................. 62-52342

[51] Int. Cl.$^4$ ................................................. G11B 5/60
[52] U.S. Cl. ..................................................... 360/103
[58] Field of Search .......................................... 360/103

[56] References Cited

U.S. PATENT DOCUMENTS

| | | | |
|---|---|---|---|
| 3,657,710 | 4/1972 | Billawala | 360/103 |
| 4,130,847 | 12/1978 | Head et al. | 360/103 |
| 4,251,841 | 2/1981 | Jacobs | 360/103 |
| 4,285,019 | 8/1981 | Scott et al. | 360/103 |

Primary Examiner—Robert S. Tupper
Attorney, Agent, or Firm—Sughrue, Mion, Zinn, Macpeak & Seas

[57] ABSTRACT

An air bearing head slider for a magnetic disk apparatus. The head slider includes outside rails, and each of the outside rails includes a flat portion forming an air bearing surface, a first leading edge tapered portion formed at an air inflow edge of the head slider, and a second leading edge tapered portion formed between the first leading edge tapered portion and the flat portion. The first tapered portion is inclined with respect to the flat portion by a first angle, and the second tapered portion is inclined with respect to the flat portion by a second angle.

13 Claims, 2 Drawing Sheets

FIG.1
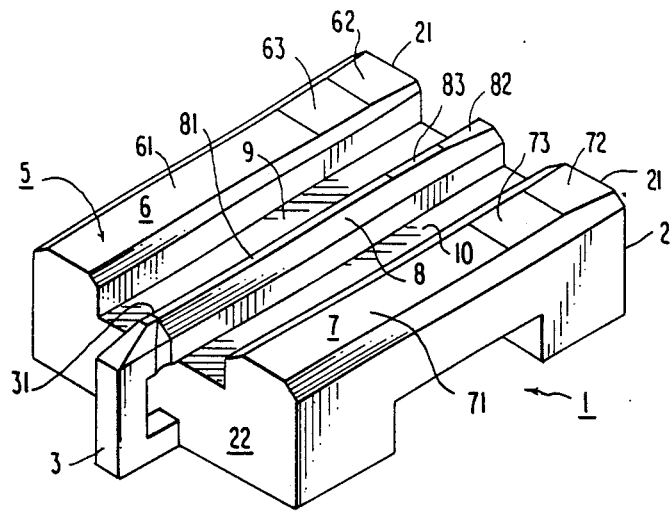
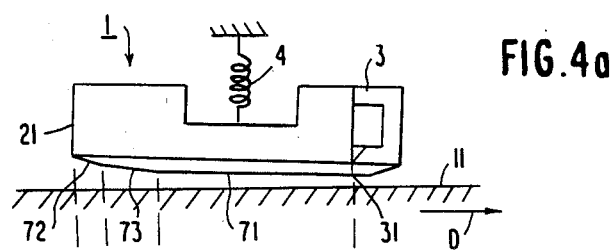
FIG.4a
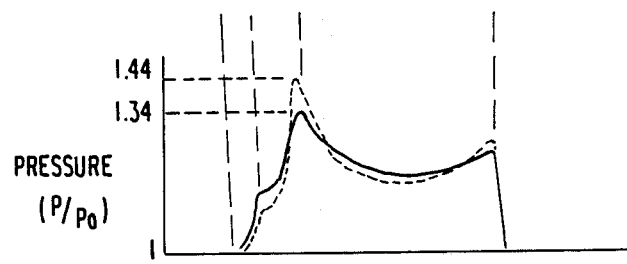
FIG.4b

FIG. 2
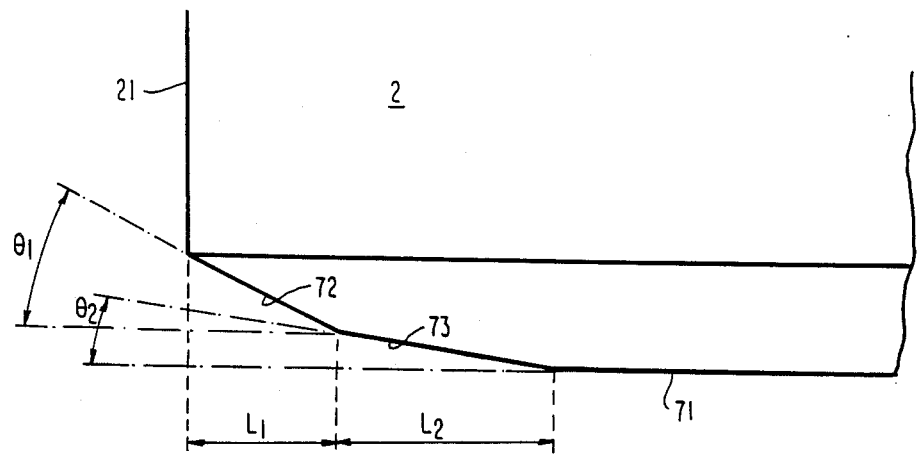
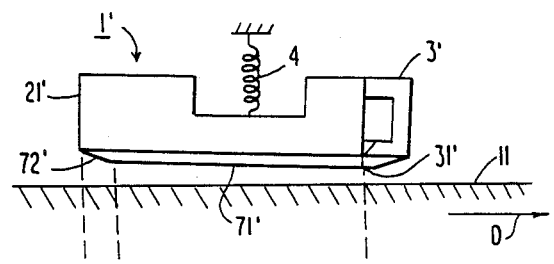
FIG. 3a
PRIOR ART
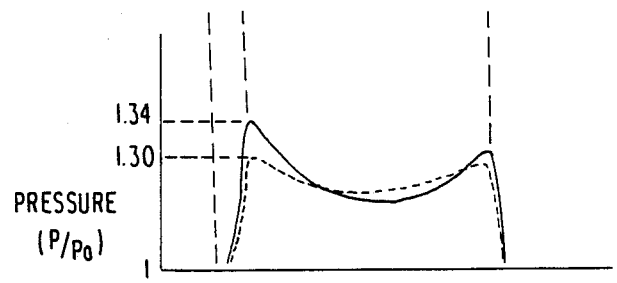
FIG. 3b
PRIOR ART

AIR BEARING HEAD SLIDER HAVING FIRST AND SECOND LEADING EDGE TAPERED PORTIONS

BACKGROUND OF THE INVENTION

The present invention relates to an air bearing head slider for a magnetic disk apparatus.

An electro-magnetic transducer element for a magnetic disk apparatus is usually mounted on an air bearing head slider utilizing the principle of a dynamic air bearing. The head slider flies at a constant flying height from a rotating disk surface. A conventional head slider includes, as is described in U.S. Pat. No. 3,823,416, two outside rails, each of which comprises a flat portion to generate the flying pressure and a leading edge taper portion disposed at an air inflow edge of the rail.

When the rotation of the magnetic disk is stopped, the head slider contacts the surface of the magnetic disk. The head slider gradually flies on the surface of the magnetic disk when the disk starts to rotate. This is called a "contact-start-stop" (CSS) mechanism. The flying pressure applied to the head slider is approximately proportional to the rotational speed of the magnetic disk. Namely, with a decrease in the rotational speed of the magnetic disk e.g., when the rotation of the magnetic disc is started and then stopped, the flying pressure applied to the head slider decreases. In particular, when the rotational speed of the magnetic disk is in the range from 10% to 40% of a constant operational speed, the head slider is not subjected to a sufficient flying pressure such that it flys with a desired flying attitude. As a result, the head slider rotates about an axis which is perpendicular to the relative moving direction of the magnetic disk. During this condition, the air inflow and outflow edges of the head slider may collide with the surface of the magnetic disk. The collision causes abrasions to the head slider and the surface of the magnetic disk, and produces undesired dust. Moreover, as a result of the collision, the head slider and the surface of the magnetic disk tend to be damaged (head crash), thereby preventing magnetic recording and reading.

SUMMARY OF THE INVENTION

An object of the present invention is, therefore, to provide an air bearing head slider which is capable of flying on the surface of the magnetic disk with a stable flying attitude even when the rotation speed of the magnetic disk is relatively low.

Another object of the present invention is to provide an air bearing head slider capable of always maintaining a sufficient flying attitude so that an air gap between its air inflow edge and the surface of the magnetic disk is larger than that between its air outflow edge and the surface.

According to one aspect of the invention, there is provided an air bearing head slider which comprises: outside rails formed on a surface to be opposed to a magnetic disk surface; a flat portion formed on each of the outside rails; a first leading edge taper portion formed on an air inflow edge of each of the outside rails, the first leading edge taper portion being inclined with respect to the flat portion by a first angle; and a second leading edge taper portion formed on each of the outside rails at a portion between the flat portion and the first leading edge taper portion, the second leading edge taper portion being inclined with respect to the flat portion by a second angle which is smaller than the first angle.

BRIEF DESCRIPTION OF THE DRAWINGS

FIG. 1 is a perspective view of an embodiment of the present invention;

FIG. 2 is a partially enlarged side view of the embodiment of FIG. 1;

FIG. 3($a$) is a side view of a conventional air bearing head slider;

FIG. 3($b$) is a graph showing the pressure distribution with respect to the length of the conventional head slider shown in FIG. 3($a$);

FIG. 4($a$) is a side view of the head slider shown in FIG. 1; and

FIG. 4($b$) is a graph showing the pressure distribution with respect to the length of the head slider shown in FIG. 4($a$).

In these drawings, the same or similar reference numerals denote the same or similar constituent elements, respectively.

DESCRIPTION OF THE PREFERRED EMBODIMENT

Referring to FIG. 1, an embodiment of the invention comprises a slider body 2 and a C-shaped magnetic core 3. The slider body 2 and the magnetic core 3 are bonded to each other so as to constitute an air bearing head slider 1 which contains a transducing gap 31. The head slider 1 is urged against a disk surface by a suspension 4 (FIG. 4($a$)). For details of the construction of the suspension 4, reference may be made to U.S. Pat. No. 4,167,765.

The slider body 2 contains the mutually parallel two outer and one center rails 6, 7 and 8, respectively, on its surface 5 which is to be opposed to a magnetic disk 11 (FIG. 4($a$)). The rails 6, 7 and 8 are separated by slots 9 and 10 for bypassing the unnecessary air flow. Air inflow and outflow edges of the slider body 2 are denoted as the leading and trailing faces 21 and 22, respectively.

Flat portions 61, 71 and 81 which become air bearing surfaces, are formed at positions of the rails 6, 7 and 8, respectively, and are contiguous to the trailing face 22. The first leading edge taper portions 62, 72 and 82 are contiguous to the leading face 21, and are inclined with respect to the flat portions 61, 71 and 81 by a first angle. The second leading edge taper portions 63, 73 and 83 are formed between the flat portions 61, 71 and 81, and the first leading edge taper portions 62, 72 and 82, respectively, and are inclined with respect to the flat portions by second angle smaller than the first angle. The flat portions 61, 71 and 81 are disposed in the same plane. Similarly, the first leading edge taper portions 62, 72 and 82, and the second leading edge taper portions 63, 73 and 83 are disposed in the respective same planes. The slider body 2 and magnetic core 3 are made, as is described in U.S. Pat. No. 3,823,416, of magnetic ferrite material. The flat portions 61, 71 and 81, the first leading edge taper portions 62, 72 and 82, and the second leading edge taper portions 63, 73 and 83 are lapped so that their surface roughness is less than 0.1 S.

FIG. 2 shows the air inflow edge of the slider body 2. The first leading edge taper portion 72 is inclined by an angle $\theta_1$ with respect to the flat portion 71 and has a longitudinal length $L_1$. The second leading edge taper portion 73 is inclined by an angle $\theta_2$ which is smaller than $\theta_1$ with respect to the flat portion 71 and has a longitudinal length $L_2$. The inclination angle and the length of the other first leading edge taper portions 62 and 82, and the other second leading edge taper portions 63 and 83 are equal to those of portions 72 and 73, respectively. In this embodiment, the angles $\theta_1$ and $\theta_2$ are chosen to be 50' (minutes) and 2' (minutes), respectively. The longitudinal length of the slider body 2 (length from the leading face 21 to the trailing face 22) is 4.06 mm, while $L_1$ and $L_2$ are 0.38 mm and 0.6 mm, respectively.

Now, the advantages of the head slider 1 according to the embodiment will be described in comparison with the conventional head slider disclosed in the U.S. Pat. No. 3,823,416. FIG. 3(a) shows the conventional head slider 1' flying on the disk surface, and FIG. 3(b) shows the pressure distribution in the length of the head slider 1'. In FIG. 3(a) a solid line corresponds to the state when the magnetic disk 11 rotates at a constant operational speed, and the dotted line corresponds to the condition when the magnetic disk 11 rotates at only 20% of the operational speed. FIGS. 4(a) and 4(b) are similar to FIGS. 3(a) and 3(b) as related to the embodiment of FIG. 1. FIGS. 3(b) and 4(b) were obtained by the computer simulation where the Reynolds equation is numerically analyzed for a finite element model.

Referring to FIGS. 3(a) and 3(b), when the magnetic disk 11 moves in a direction D relative to the head slider due to the disk rotation at the operation rotation speed that is, 3,600 revolutions per minute (r.p.m.), the flying pressure applied to the head slider 1' has a peak pressure at the boundary between the taper portion 72' and the flat portion 71' as shown by the solid line. With the decrease of the rotation speed of the magnetic disk 11 to 20% (720 r.p.m.) of the operation speed, the flying pressure distribution becomes rather flat, as is shown by dotted line, so that the pressure peaks at gap 31' and the boundary position between the taper portion 72' and the flat portion 71', both decrease. Particularly, the peak value at the boundary position decreases from 1.34 (P/Pa) to 1.30 (P/Pa) when the rotational speed decreases to 20% of the operational speed. Therefore, the head slider 1' tends to rotate around an axis which is perpendicular to the moving direction D of the magnetic disk 11. As a result, the leading and trailing edges of the head slider 1' may alternately collide with the surface of the magnetic disk 11.

Referring to FIGS. 4(a) and 4(b), when the magnetic disk 11 rotates at the operation rotation speed, the flying pressure distribution as shown by solid line has the large peaks at the boundary between the second taper portion 73 and the flat portion 71, and at the gap 31. Also, it has a small peak at the boundary between the first taper portion 72 and the second taper portion 73. When the rotation speed of the disk 11 decreases to 20% of the operational speed, as shown by the dotted line, the peak value at the boundary between the flat portion 71 and the second taper portion 73 increases from 1.34 (P/Pa) to 1.44 (P/Pa). In other words, the pressure at the leading portion of the head slider 1 (air inflow side) is relatively larger than that at the trailing portion (air outflow side). As a result, the head slider 1 steadily flies on the surface of the magnetic disk 11 with a flying attitude such that the flying height at the leading portion is larger than that at the trailing portion. Accordingly, the head slider 1 does not rotate around the axis perpendicular to the moving direction D of the magnetic disk 11 (clockwise and counterclockwise direction about an axis perpendicular to the sheet of FIG. 4(a)). Consequently, the undesired collision of the leading and trailing edges of the head slider 11 with the disk surface can be prevented even when the flying height of the head slider 11 becomes small.

The increase of the flying pressure at the air inflow side of the head slider 1 upon a low rotation speed of the disk 11 results from the existence of wedge-shaped air film generated at the second taper portions 63 and 73 in addition to the air film generated at the first taper portions 62 and 72. The strength of the pressure depends on the length $L_2$ and the angle $\theta_2$ of the second taper portions 63 and 73. If the length $L_2$ is too short, or if the angle $\theta_2$ is too large, the pressure generated by the low rotation speed of the magnetic disk is decreased. On the other hand, if the $L_2$ is too long, the position of the pressure peak shifts to the air outflow side, with the result that the flying attitude of the head slider 1 becomes unstable. The desired length of the sum of the first and second taper portions 72 and 73 are preferable to be between 5–40% of the total length of the slider body 2. Moreover, experiments by the inventor indicate that the angle $\theta_1$ of the first taper portion 72, and the angle $\theta_2$ of the second taper portion 73, are preferable to be 30' (minutes)–1° (degree), and 1' (minute)–10' (minutes), respectively, in order to stabilize the flying attitude of the head slider 1.

In the above description, the preferred embodiment of the invention is applied to the head slider having the C-shaped core. However, it should be understood that the invention can also be applied to a head slider wherein a magnetro-resistive (MR) element is buried in a ceramic slider, or to a head slider, wherein a thin film magnetic transducer element is formed on a slider body of $Al_2O_3$—TiC.

As is described above, according to the present invention, the first and second taper portions are formed at the air inflow side of the head slider so that stable flying characteristics can be obtained, even when the disk rotates at a rélatively low rotation speed. Consequently, the possibility of damage due to a collision of the head slider with the disk surface (head crash) can be reduced.

What is claimed is:

1. An air bearing head slider comprising: outside rails, each of said outside rails including a flat portion forming an air bearing surface which is to be opposed to a surface of a magnetic disk moving relative to said head slider; a first leading edge tapered portion formed on each of said outside rails at an air inflow edge on the upstream side of the relative movement of the magnetic disk to said head slider, said first leading edge tapered portion being inclined with respect to said flat portion by a first angle; and a second leading edge tapered portion formed on each of said outside rails between said flat portion and said first leading edge tapered portion, said second leading edge tapered portion being inclined with respect to said flat portion by a second angle which is smaller than said first angle; said first leading edge tapered portion of said outside rails being disposed in a first common plane and said second leading ledge tapered portions of said outside rails being disposed in a second common plane, the summed longitudinal length of said first and second leading edge tapered portions being between five and forty percent of the total longitudinal length of said head slider.

2. The air bearing head slider as claimed in claim 1, wherein said first angle is between 30' and 1°.

3. The air bearing head slider as claimed in claim 2, wherein said second angle is between 1' and 10'.

4. The air bearing head slider as claimed in claim 1, further comprising an electromagnetic transducer element mounted at an air outflow edge on a downstream side of the relative movement of said magnetic disk.

5. The air bearing slider as claimed in claim 1, further comprising a center rail disposed between said outside rails.

6. The air bearing slider as claimed in claim 5, wherein said center rail is separated from said outside rails by respective slots for bypassing unnecessary air flow.

7. The air bearing slider as claimed in claim 5, wherein said center rail has a flat portion, a first leading edge tapered portion disposed at an air inflow edge on said center rail, and a second tapered edge portion formed between said flat portion and said first leading edge tapered portion, said first leading edge tapered portion of said center rail being inclined with respect to said flat portion of said center rail by said first angle, and said second tapered edge portion of said center rail being inclined with respect to said flat portion of said center rail by said second angle.

8. The air bearing slider as claimed in claim 7, wherein each of said first leading edge tapered portions of said outside rails and said center rail is disposed in a common plane.

9. The air bearing slider as claimed in claim 7, wherein each of said second leading edge tapered portions of said outside rails and said center rail is disposed in a common plane.

10. The air bearing slider as claimed in claim 7, wherein each of said flat portions of said outside rails and said center rail is disposed in a common plane.

11. The air bearing slider as claimed in claim 7, further comprising a leading face which is contiguous with each of said first leading edge tapered portions of said outside rails and said center rail, and a trailing face which is contiguous with each of said flat portions of said outside rails and said center rail.

12. The air bearing slider as claimed in claim 11, further comprising a C-shaped magnetic core disposed at the trailing face of the slider.

13. The air bearing slider as claimed in claim 11, wherein the length from said leading face to said trailing face is approximately 4.06 mm.

* * * * *